April 8, 1958　　　S. L. SHIVE　　　2,830,180
NOISY SIGNAL DETECTOR

Filed May 27, 1955

INVENTOR,
SCOTT L. SHIVE.

BY *Frederick H. Strader*

ATTORNEY

2,830,180

NOISY SIGNAL DETECTOR

Scott L. Shive, Little Silver, N. J., assignor to the United States of America as represented by the Secretary of the Army Application May 27, 1955, Serial No. 511,815

1 Claim. (Cl. 250—30)

(Granted under Title 35, U. S. Code (1952), sec. 266)

The invention described herein may be manufactured and used by or for the Government for governmental purposes, without the payment of any royalty thereon.

This invention relates to detector circuits and, more particularly, to a circuit for detecting small signals in the presence of relatively high ambient noise. More particularly, this device relates to synchronous detection of alternating current signals.

This device consists essentially of a gating or switching circuit which alternately presents a high and then a low impedance for equal portions of time to a line which contains a signal voltage of a given frequency in the presence of a relatively high, undesired, ambient noise. When the frequency of the switching is made to coincide exactly with the given frequency of the signal to be detected and is in the correct phase relationship with this incoming signal, the signal voltage will appear across the detector load, or indicator, providing a direct current component with an average value proportional to the signal.

This system depends on the fact that only those frequencies which exactly correspond to the frequency of the switching will be detected and only those that are of the correct phase relationship will produce a direct current to actuate the indicator. The noise signal, which is random, will have a zero mean level effectively cancelling itself in the output of this system.

This system is not to be confused with standard gating detecting means wherein the detecting circuit is actuated by any signals that may occur during a given interval of time, since these systems will detect both the signal and the noise during the gating interval. These and other noise reducing systems depend on the quiescent time of the circuit to reduce the effective signal to noise ratio.

It is, therefore, an object of this invention to provide a detecting system.

It is a further object of this invention to provide a system for detecting small signals in the presence of random noise.

It is a further object of this invention to provide a system for detecting signals of a known frequency in the presence of a relatively high ambient noise level.

Figure 1:
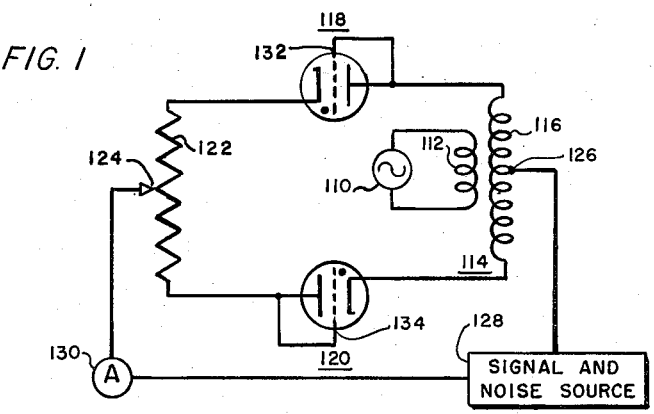
Figure 2:
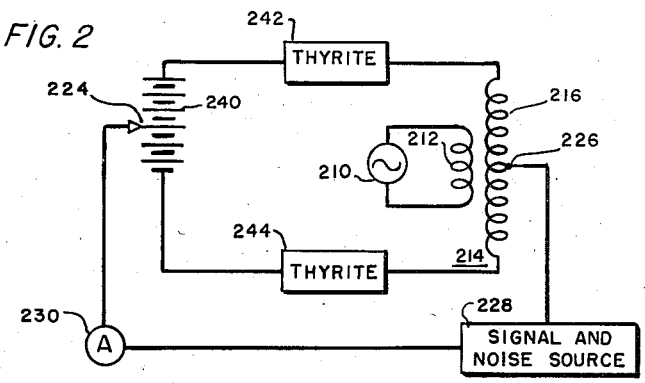
Figure 3:
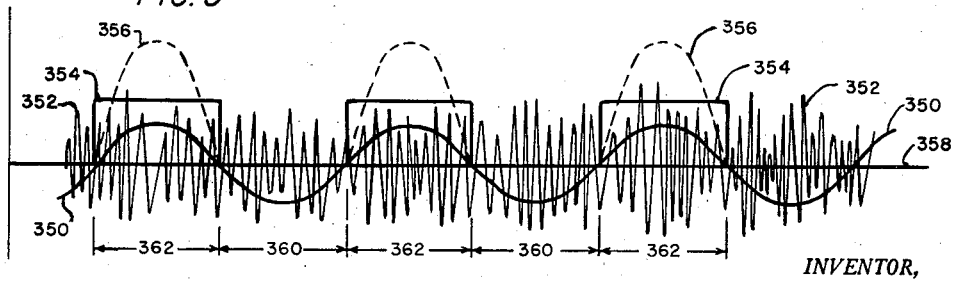

Other and further objects of this invention will become apparent from the following specification and the drawings of which:

Fig. 1 is a schematic circuit diagram showing a preferred embodiment of this invention using electronic switching, Fig. 2 is a schematic circuit diagram of another detector circuit utilizing non-linear circuit elements for synchronous switching, and Fig. 3 shows waveforms illustrating the effective operation of this device.

The basic concept of this device is that the circuit connecting the signal energy to the detector load is actuated or is switched in phase with the anticipated signal. One form of switching circuit by which relatively low signal frequency detection may be accomplished would consist of a mechanically driven switch or commutator which is driven at an angular speed having a harmonic relation to the signal to be detected; that is to say the switch is mechanically opened and closed in phase with the desired peak of the incoming signal. For one-half cycle the commutator presents an infinite impedance or an open circuit and no current flows from the source to the detector load. On the other half cycle the commutator presents a short circuit or a zero impedance and current flows from the source to the detector load, limited only by the impedances of the load and the source itself. Since current can flow only during half cycles of the signal, half wave rectification of the signal occurs and this results in a current flowing through the detector load which is proportional to the amplitude of the signal voltage. Alternating voltages from random noise, or components of voltages at any frequency other than that of the signal and switching function are not rectified and, therefore, would produce no output in a direct current detector.

The frequency to which a direct current detector such as a direct current indicator or ammeter will respond, as limited by its inertia and damping, determines the bandwidth above and below the switching frequency within which noise voltage may produce an oscillatory movement of the meter indicator. For example, if the meter responds to frequencies from zero to five cycles per second, any noise voltages in a frequency band five cycles on either side of the switching frequency may produce a corresponding oscillatory meter response. However, the meter may be damped to any desired degree and may be made to respond to frequencies no greater than a small fraction of one cycle per second which will result in an extremely small bandwidth of frequencies that may actuate the meter. In this sense, the circuit becomes a selective filter with extremely narrow band response whose center frequency of response may be changed to any desired value by changing the switching frequency. The bandwidth of the filter may also be controlled by regulating the degree of meter damping.

Since mechanical switching would not be the most desirable means for performing this function, particularly at high frequencies, an electronic gating circuit is shown in Fig. 1 as a preferred embodiment of this invention. In Fig. 1 the voltage of an alternating current generator 110 is applied through the primary 112 of transformer 114 to the secondary 116, which builds up a potential across the plates and cathodes of the two thyratrons 118 and 120 connected in series across the secondary. As will be apparent from the drawing, the grids of the thyratrons are connected to the plates so that the thyratrons function as diodes. A potentiometer 122, having a center tap or slider 124, is connected between the two thyratrons to establish a neutral point. The slider may be adjustable for circuit balancing purposes. The potentiometer 122 will also act as a current limiting device for the current in the thyratrons.

This circuit acts as a switching device across the center tap 124 of the potentiometer and the center tap 126 on the secondary of the transformer. The incoming signal and noise source 128 which may be a radio receiver, wire line, or other well known signal receiving device, is connected in series with the detector load 130 across these two center tap terminals. The detector load or direct current indicator is shown as an ammeter, although it could be any of several well known electronic devices.

In operation, the alternating current generator 110 and transformer 114 provide alternating current across the pair of thyratrons 118 and 120 to fire them on one-half cycle and extinguish them on the other. Consequently, during the half cycle when the thyratrons are conducting, an effective short circuit is provided across the parallel paths from the center tap 126 of the secondary to the center tap 124 of the potentiometer. Any voltage appearing in the output of the receiver 128 during this conducting interval will cause a current to flow in the ammeter 130. If the same polarity of voltage appears during subsequent conducting intervals, a mean direct current will be indicated by the ammeter 130. The random noise signal and components of any other signals not exactly synchronized with or in phase with this precise switching action will produce both positive and negative components which the ammeter will integrate to a zero level.

This circuit produces, electronically, the same effect as a mechanical switching device.

The grids 132 and 134 of the thyratrons are shown connected to the plates to utilize the same voltage for both the triggering and the firing. A separately generated and synchronized alternating voltage could be supplied to the grids in a well known manner to insure more consistent and precisely timed firing of the two thyratrons.

The thyratrons may be replaced by any rectifier elements, including vacuum tubes or solid state devices, connected in series across the secondary. When such other rectifier elements are used, both must be connected in the same direction relative to the driving voltage and they must have approximately similar impedance-voltage characteristics. Any such elements must, of course, have the characteristic of providing the low impedance during the one half cycle of energization and a high impedance during the opposing half cycle.

Virtually any device with a non-linear impedance-voltage characteristic, even though not necessarily a rectifying device with different forward and reverse impedances, may be used with only slight modification of the previously described circuit.

One example of a switching circuit where a matched pair of elements, such as thyrite, having non-linear impedance characteristics is utilized, is shown in Fig. 2. In this circuit the battery 240 furnishes a constant bias voltage across the thyrite elements 242 and 244 to maintain the non-linear condition. The other elements of this switching circuit are similar to those of Fig. 1 and are similarly numbered.

A center tap 224 on the battery 240 is equivalent to the center tap of potentiometer 122 of Fig. 1. The alternating current generator 210 provides an alternating voltage through the transformer 214 which is superimposed on the biasing voltage to raise the lower and unidirectional potential applied to the thyrite elements so that the impedance of these elements, which is a function of the potential across the elements, is alternately correspondingly lower and higher. The admittance or effective resistance between the points 224 and 226 is similarly alternately lower and higher and selective rectification of a signal voltage of the correct frequency from 228 will produce a corresponding indication in the ammeter 230.

An analysis of the selective rectification process in the circuits of Figs. 1 and 2 may be made on following basis. The current flowing through the ammeter at any instant is equal to the product of the voltage in that circuit at that instant and the instantaneous value of admittance around the circuit. Typical voltages of signal and noise are shown with respect to time on the graph in Fig. 3. The time and polarity of the switching function and the resulting current are also superimposed on this graph.

The admittance as a function of time may be the square or rectangular wave 354 with a base approximately on the zero voltage axis and a minimum value equal to the admittance around the circuit during the half cycle that the switch is in the open circuit position. This occurs during the intervals 360 along the time axis 358.

The maximum value occurs during the other half cycle when the switching function is in its short circuit position as shown during the time intervals 362. The signal voltage to be detected is the sine wave 350, which has the same frequency as the switching function 354, and the resulting current is equal to the product of this polarity of the sinusoidal signal voltage wave and the zero based square or rectangular admittance wave. Since a square wave function of this form may be represented by a series of harmonic sine waves, the resulting current is then the sum of the products of the sine wave signal voltage with each of the sine wave harmonic components of the admittance wave.

A direct current proportional to the main value of the rectified signal voltage 356, results only from the product of the signal voltage and the fundamental, or first harmonic, of the admittance wave, because the product of two sine functions can contain a constant, or direct current term, only when the angles, or the frequencies, are identical. However, because of the harmonic content of the admittance wave, small direct currents may result from the products of the harmonics of the admittance wave with components of the noise voltage existing at those same frequencies. Such direct currents, however, will be extremely small because any single frequency component of a random noise voltage is, theoretically, infinitely small, but low frequency voltages within the response band of the direct current meter will be produced by the combined sum of noise voltage components within that narrow frequency band around each of the specific harmonic frequencies of the admittance wave.

These low frequency voltages will give rise to random fluctuations of the direct current ammeter. The products of higher harmonics of the admittance wave and noise voltages of those higher frequencies will give rise to progressively lower amplitudes of fluctuation voltages, however, because the amplitude of any of the square wave harmonics is inversely proportional to the order of the harmonic. Moreover, the fluctuation voltages due to all harmonics of the admittance wave, except the first, or fundamental, may be eliminated altogether by a low pass filter in the ammeter circuit which will cut out all noise voltage frequencies above the signal frequency. The harmonics could also be eliminated if the admittance-time function were a sinusoidal instead of a square wave.

Considering only the sine wave signal voltage and the square pulsed admittance wave based on the zero axis, the damped ammeter which reads the average of the product of these two functions might thus be considered to indicate one point on the cross correlation curve of the sine wave and the square wave of this specific type. If the signal frequency were made to shift phase slowly and continuously with respect to the switching frequency, the ammeter reading relative to the phase would represent a plot of the cross correlation function.

It is evident that the efficiency of rectification of the signal frequency, i. e., the magnitude of the average direct current for a given alternating current signal voltage and given maximum circuit admittance, is greater for a square, or rectangular, wave admittance-versus-time function than for any other wave shape.

The switching signals in this concept must be precisely synchronized with the incoming signal to be detected and since the incoming signal will presumably be, or is in most cases, of known value, this frequency may be preset at the receiving stage. The phase relationship of the preset frequency may then be adjusted to produce optimum detection. Methods of synchronizing incoming signals with local generators or oscillators are well known in the art and would be applicable here in any case where the incoming signal is basically detectable either before it passes through the noise reducing detector or after. Any device for phase synchronism would be applicable to the teachings of this invention.

If the frequency is unknown certain frequency sweeping techniques suggest themselves wherein the frequency of the switching function is slowly varied until a tangible signal is detected in which case the frequency is locked. It is pointed out again that with this device a signal voltage substantially lower than the ambient noise level may be clearly indicated.

Other and further variations of this circuit that will provide the functions taught herein will be obvious to any one skilled in the art. Having thus described my invention, what is claimed is:

A circuit for detecting an amplitude modulated predetermined fixed signal frequency in the presence of high random noise comprising a transformer having a primary and a tapped secondary winding; a biasing battery having an adjustable tap; a thyrite element included between one end of said secondary winding and one end of said battery; a second thyrite element included between the other end of said secondary winding and the other end of said battery; a local oscillator operating at said predetermined fixed signal frequency and phase and connected to said primary for producing conduction of said thyrite elements on alternate half cycles; a damped direct current indicator; a serially connected circuit including said secondary tap, said fixed signal frequency, said indicator and said battery tap, whereby conduction of said thyrite elements permits only said predetermined fixed signal frequency to be rectified and indicated.

References Cited in the file of this patent

UNITED STATES PATENTS

| | | |
|---|---|---|
| 1,959,459 | Cowan | May 22, 1934 |
| 2,713,606 | Sziklai | July 19, 1955 |
| 2,718,546 | Schlesinger | Sept. 20, 1955 |
| 2,794,012 | Dome | June 4, 1957 |

OTHER REFERENCES

"Signal Detector for High Noise Levels," by Scott L. Shive, Electrons, June 1954, page 210.